United States Patent
Komatsu et al.

(10) Patent No.: US 7,271,979 B2
(45) Date of Patent: Sep. 18, 2007

(54) FLEXIBLE DISK DRIVE HAVING AN EJECT BASE USABLE AS A COVER

(75) Inventors: Hisateru Komatsu, Yamagata (JP); Makoto Konno, Yamagata (JP); Noriyuki Kobayashi, Yamagata (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 385 days.

(21) Appl. No.: 11/065,912

(22) Filed: Feb. 25, 2005

(65) Prior Publication Data

US 2006/0023349 A1    Feb. 2, 2006

(30) Foreign Application Priority Data

Jul. 28, 2004    (JP)    ............... 2004-220390

(51) Int. Cl.
*G11B 17/02*    (2006.01)

(52) U.S. Cl. .................................. 360/99.02

(58) Field of Classification Search ............ 360/99.02, 360/133, 99.08, 99.04, 99.06
See application file for complete search history.

(56) References Cited

U.S. PATENT DOCUMENTS

| | | | |
|---|---|---|---|
| 5,898,539 A * | 4/1999 | Yokota et al. ........... | 360/99.06 |
| 2001/0006442 A1* | 7/2001 | Komatsu et al. ......... | 360/99.04 |
| 2003/0039058 A1* | 2/2003 | Komatsu et al. ......... | 360/99.02 |
| 2003/0043501 A1* | 3/2003 | Komatsu et al. ......... | 360/99.02 |

FOREIGN PATENT DOCUMENTS

| | | |
|---|---|---|
| JP | 8-203221 A | 8/1996 |
| JP | 3405374 B2 | 3/2003 |

* cited by examiner

*Primary Examiner*—Allen Cao
(74) *Attorney, Agent, or Firm*—Frishauf, Holtz, Goodman & Chick, P.C.

(57) ABSTRACT

In a flexible disk drive for a flexible disk, a main frame defines a receiving portion for receiving the flexible disk. The main frame has a principal surface which faces the receiving portion and extends in a first direction and a second direction perpendicular to the first direction. A carriage assembly is mounted on the main frame and has a magnetic head for accessing the flexible disk. The carriage assembly is movable to carry the magnetic head along the principal surface. An eject base is coupled to the main frame and has a main portion facing the principal surface and side plates opposite to each other in the first direction. Between the main frame and the eject base, an eject plate is placed movable in the second direction for ejecting the flexible disk from the receiving portion. The eject plate has side plates facing the side plates of the eject base in the first direction, respectively. A guiding mechanism is coupled to the side plates of the eject base and to the side plates of the eject plate and guides movement of the eject plate in the second direction.

13 Claims, 12 Drawing Sheets

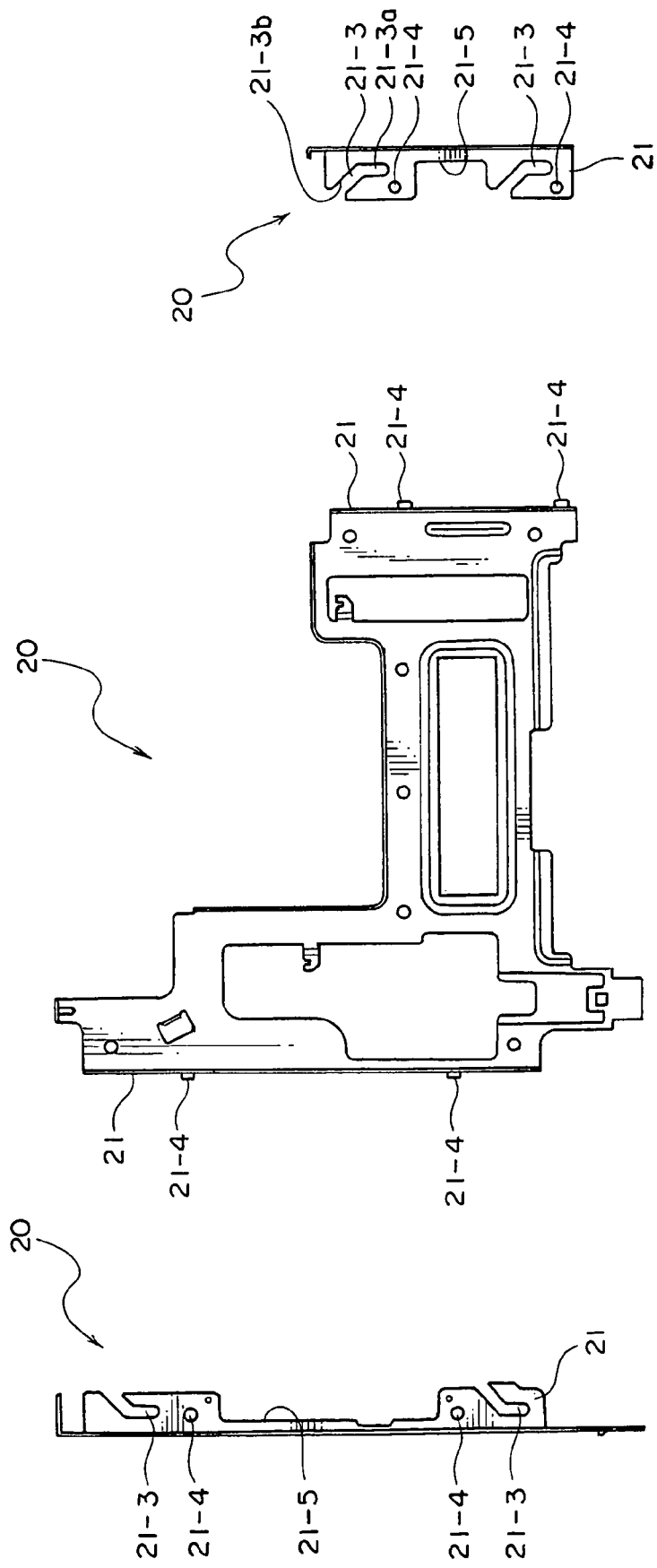

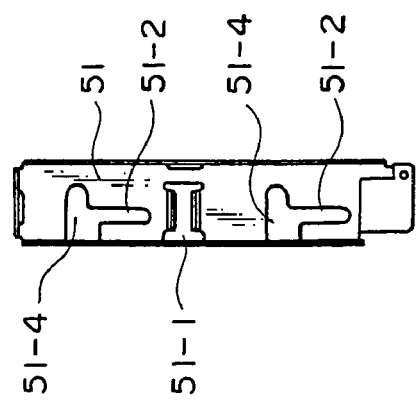
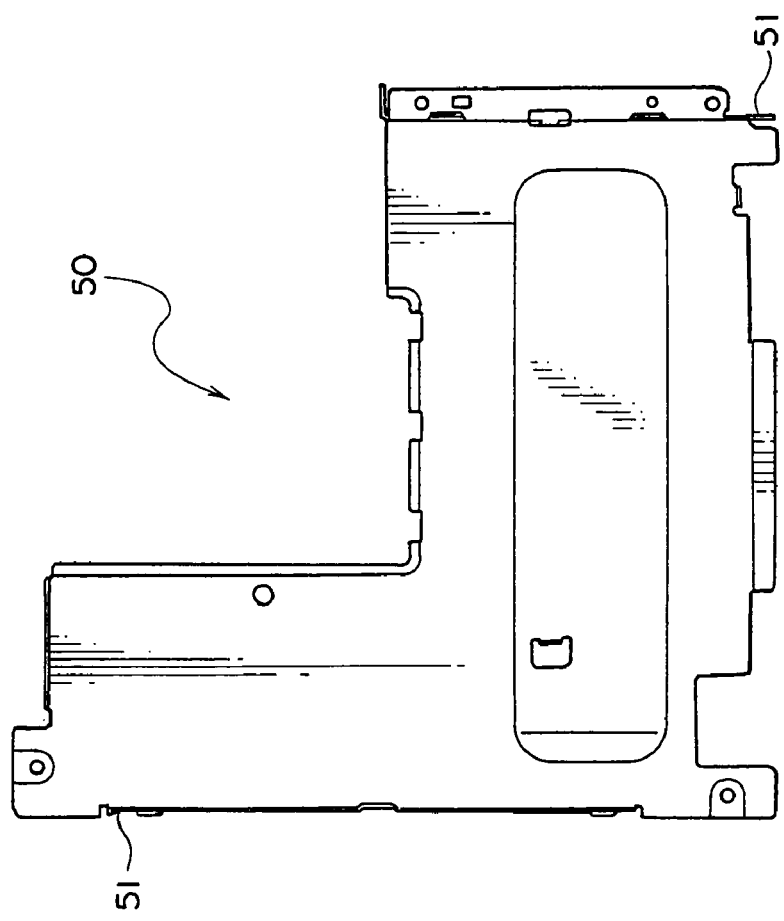
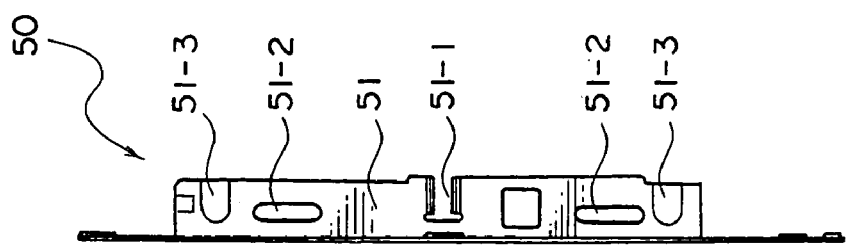
FIG. 6C
FIG. 6A
FIG. 6B

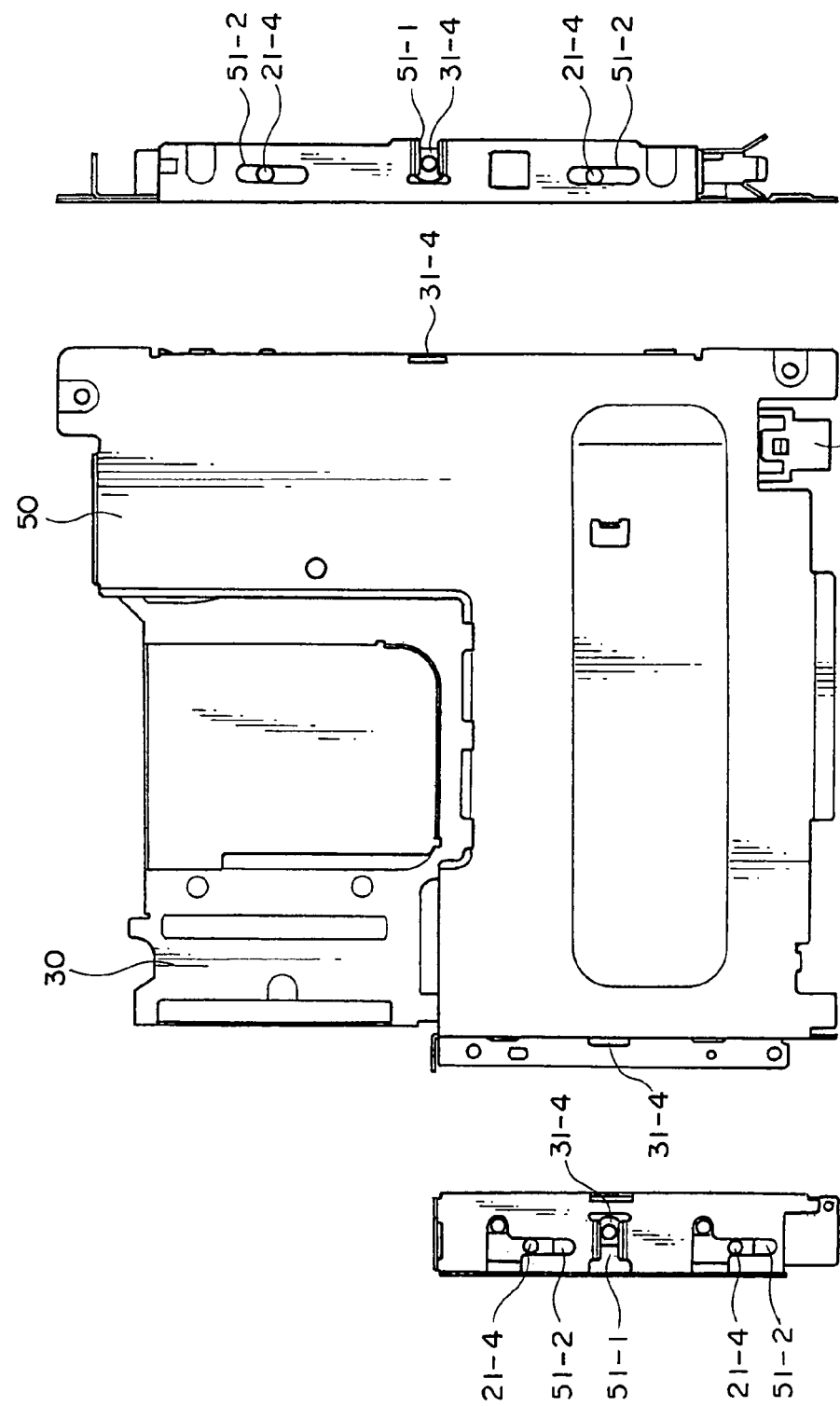

FLEXIBLE DISK DRIVE HAVING AN EJECT BASE USABLE AS A COVER

This application claims priority to prior Japanese patent application JP 2004-220390, the disclosure of which is incorporated herein by reference.

BACKGROUND OF THE INVENTION

This invention relates to a thin-profile flexible disk drive for use in writing and reading information into and from a flexible disk.

As well known, a flexible disk drive (hereinafter may be abbreviated to "FDD") is an apparatus for writing and reading (recording and reproducing) data into and from a disk-shaped magnetic recording medium of a flexible disk (hereinafter may be abbreviated to "FD") inserted therein. The flexible disk drive is adapted to be mounted to a portable electronic apparatus, such as a laptop personal computer, a notebook-type personal computer, or a notebook-type word processor.

The flexible disk drive of the type comprises a magnetic head for carrying out data reading and writing operations on the magnetic recording medium of the flexible disk, a carriage assembly for holding the magnetic head at its end so that the magnetic head is movable with respect to the flexible disk in a predetermined radial direction, a stepping motor for moving the carriage assembly in the predetermined radial direction, and a direct drive (DD) motor for rotating the magnetic recording medium while holding the flexible disk. As the DD motor, a spindle motor or the like is generally used.

In recent years, following the reduction in profile of the portable electronic apparatus, the flexible disk drive contained in or mounted to the portable electronic apparatus is also reduced in profile. In addition to the reduction in profile of the flexible disk drive, it is desired to reduce the size in a depth direction.

Proposal has already been made of a flexible disk drive achieving such reduction in size in the depth direction (for example, see Japanese Unexamined Patent Application Publication (JP-A) No. H8-203221). In the flexible disk drive disclosed in JP-A No. H8-203221, an assembly of a stepping motor and a feeding screw is arranged in an inner area of a main frame on a side opposite to an insertion slot of the flexible disk to be adjacent to one of left and right side edges of the main frame. The feeding screw extends in parallel to the one of the left and the right edges of the main frame. The carriage assembly extends in parallel to a principal surface of the main frame and in a direction perpendicular to the feeding screw.

As the above-mentioned flexible disk drive achieving the reduction in size in the depth direction, proposal has also been made of a flexible disk drive which does not require high accuracy in size of a pin formed on a disk holder and a guide groove formed on an eject plate to guide the pin (for example, see Japanese Patent Publication (JP-B) No. 3405374). In the flexible disk drive disclosed in JP-B No. 3405374, the disk holder has opposite side plates each of which is provided with upward-moving and downward-moving pins. The eject plate has opposite side plates each of which is provided with downward-movement and upward-movement guide grooves. Each of the downward-movement guide grooves has a slant edge for moving the downward-moving pin downward only when a flexible disk is inserted. Each of the upward-movement guide grooves has a slant edge for moving the upward-moving pin upward when the flexible disk is ejected. In detail, at least one of the opposite side plates of the disk holder is provided with two downward-moving pins and one upward-moving pin interposed therebetween. A corresponding one of the opposite side plates of the elect plate is provided with two downward-movement guide grooves corresponding to the two downward-moving pins and one upward-movement guide groove corresponding to the one upward-moving pin.

The existing thin-profile flexible disk drive has an eject base exclusively for an eject mechanism in order to be slidable the eject plate in forward and backward directions. Between the eject base and the eject plate, a pair of eject springs are bridged. In this connection, the eject base is provided with a pair of long holes having a size sufficient to accommodate the eject springs.

In order to slidably hold the eject plate with respect to the eject base, the eject base is provided with four side guides formed in the vicinity of the opposite side plates by cutting and bending. In order to form these slide guides, the eject base is provided with four openings. On the other hand, the eject base is provided with four openings for receiving the slide guides, respectively.

In order to close the long holes and the openings, the existing thin-profile flexible disk drive has an upper cover covering the eject base. The upper cover is designed to have a large size which is sufficient to cover a whole of the eject base. However, such a large cover raises a cost of materials.

SUMMARY OF THE INVENTION

It is therefore an object of this invention to provide a thin-profile flexible disk drive having an eject base usable as a cover for covering an eject plate and others.

It is another object of this invention to provide a thin-profile flexible disk drive of the type described, in which an upper cover can be reduced in a size thereof.

Other objects of the present invention will become clear as the description proceeds.

According to an aspect of the present invention, there is provided a flexible disk drive for a flexible disk, which comprises a main frame defining a receiving portion for receiving the flexible disk, the main frame having a principal surface which faces the receiving portion and extends in a first direction and a second direction perpendicular to the first direction, a carriage assembly mounted on the main frame and having a magnetic head for accessing the flexible disk, the carriage assembly being movable to carry the magnetic head along the principal surface, an eject base coupled to the main frame and having a main portion facing the principal surface and side plates opposite to each other in the first direction, an eject plate placed between the main frame and the eject base and movable in the second direction for ejecting the flexible disk from the receiving portion, the eject plate having side plates facing the side plates of the eject base in the first direction, respectively, and a guiding mechanism coupled to the side plates of the eject base and to the side plates of the eject plate for guiding movement of the eject plate in the second direction.

BRIEF DESCRIPTION OF THE DRAWING

FIG. 4A is a rear plan view of an eject plate used in the thin-profile flexible disk drive illustrated in FIG. 1;

FIG. 4B is a left side view of the eject plate;

FIG. 4C is a right side view of the eject plate;

FIG. 6A is a rear plan view of an eject base used in the thin-profile flexible disk drive illustrated in FIG. 1;

FIG. 6B is a left side view of the eject base;

FIG. 6C is a right side view of the eject base;

FIG. 7A is a plan view of an assembly of the eject base illustrated in FIGS. 6A to 6C, the eject plate illustrated in FIGS. 4A to 4C, and the disk holder illustrated in FIGS. 5A to 5C;

FIG. 7B is a left side view of the assembly;

FIG. 7C is a right side view of the assembly;

FIG. 7D is a front view of the assembly;

DESCRIPTION OF THE PREFERRED EMBODIMENT

Figure 1:
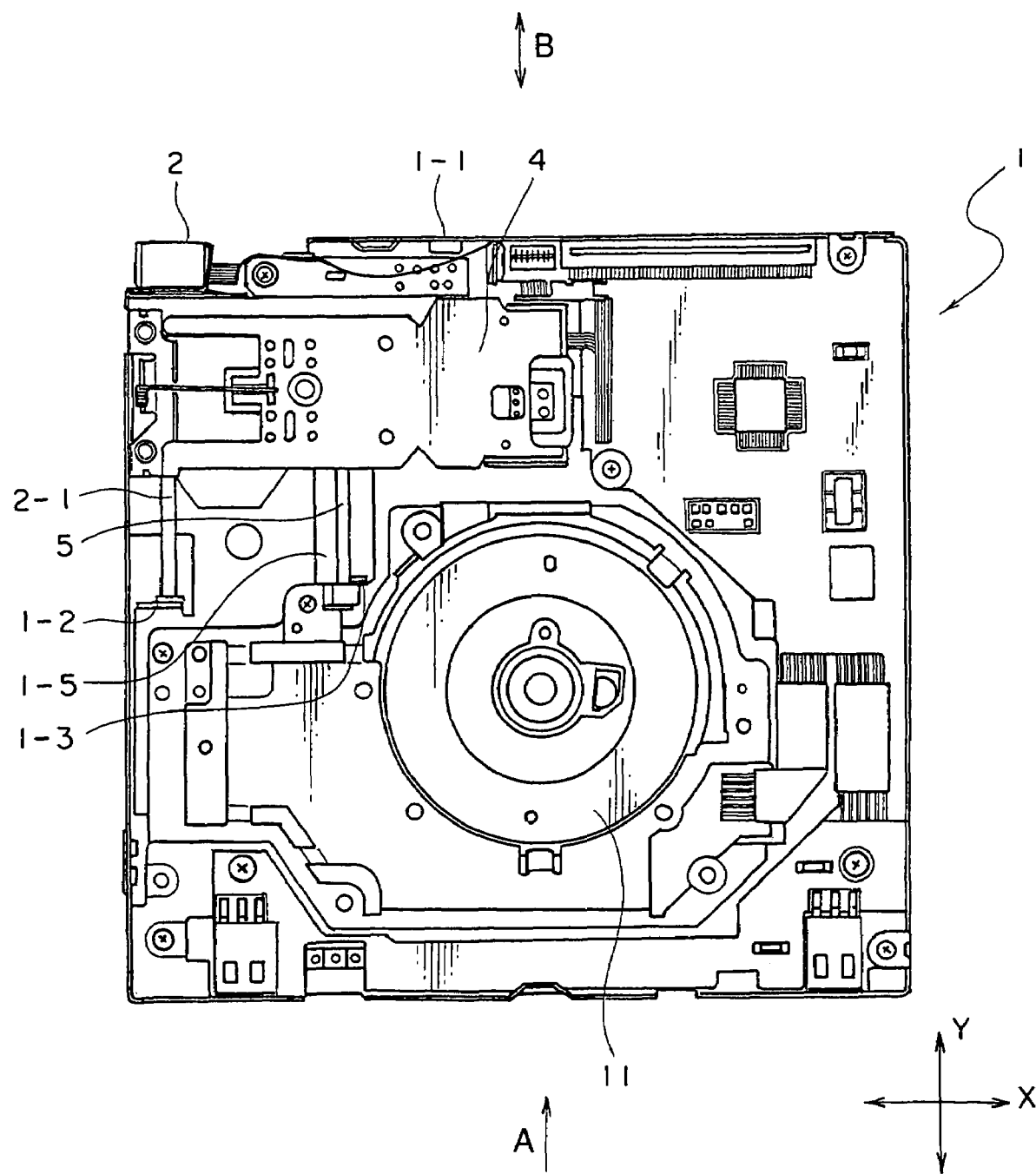
FIG. 1 is a plan view showing a characteristic part of a thin-profile flexible disk drive according to one embodiment of this invention.
Figure 2:
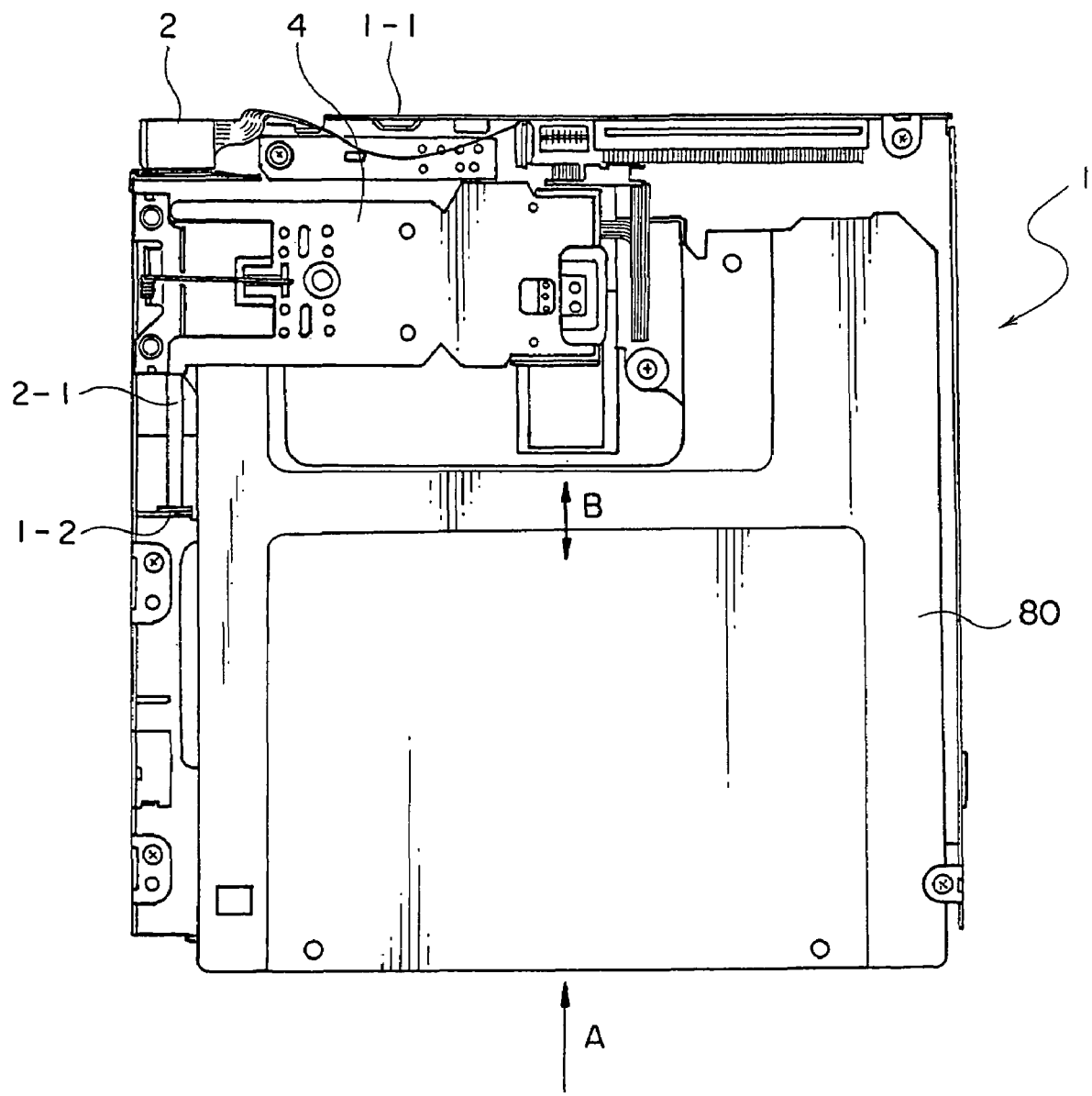
FIG. 2 is a plan view of the thin-profile flexible disk drive in FIG. 1 together with a flexible disk.

Referring to FIGS. 1 and 2, description will be made of a thin-profile flexible disk drive according to one embodiment of this invention.

The thin-profile flexible disk drive illustrated in the figures comprises a main frame 1. The main frame 1 is slightly greater in size (the difference in size being within a range of +10 mm) than a flexible disk 80 in both of a width direction and a depth direction. The main frame 1 defines a receiving portion for receiving the flexible disk, and has a principal surface which faces the receiving portion and extends in a first direction X and a second direction Y A direction perpendicular to the first and the second directions X and Y will be called hereunder a third direction.

The flexible disk 80 is inserted into a main body of the flexible disk drive in a direction depicted by an arrow A in FIG. 2. The stepping motor 2 is fixed at a position adjacent to a left one of opposite side walls of the main frame 1 by utilizing a part of a rear wall 1-1.

The stepping motor 2 is provided with a feeding screw 2-1. The feeding screw 2-1 has an end rotatably supported by a supporting portion 1-2 formed on the main frame 1 by cutting and bending. The feeding screw 2-1 is engaged with a part of a carriage assembly 4 to which a magnetic head (which will later be described) is mounted for accessing the flexible disk 80. As a result, by rotation of the feeding screw 2-1, the carriage assembly 4 moves along a predetermined radial direction B of the flexible disk 80 to carry the magnetic head. To the main frame 1, a guide bar 5 is fixed by two supporting portions 1-3 (only one being illustrated in FIG. 1) formed by cutting and bending and extends in parallel to the feeding screw 2-1.

Figure 3:
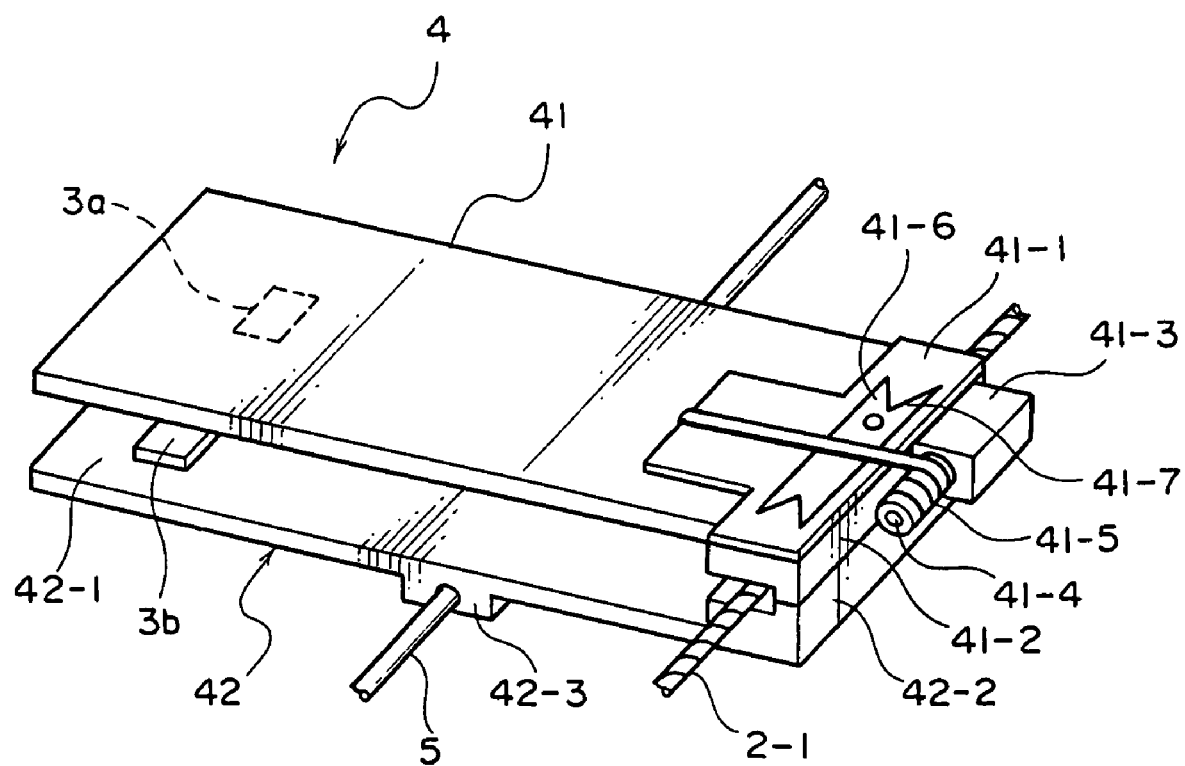
FIG. 3 is a perspective view of a carriage assembly used in the thin-profile flexible disk drive illustrated in FIG. 1.
Figures 5A, 5B, 5C, 5D:
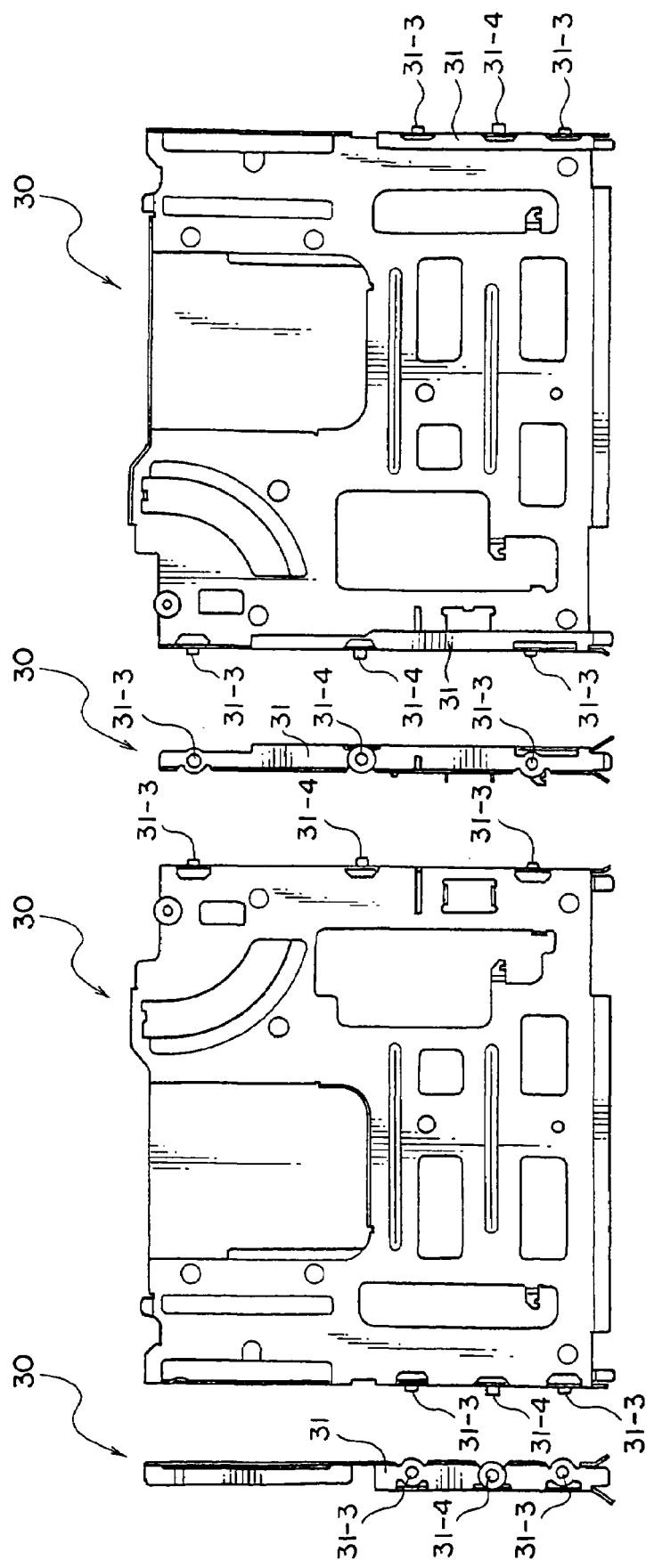
FIG. 5A is a plan view showing a disk holder used in the thin-profile flexible disk drive illustrated in FIG. 1.
FIG. 5B is a left side view of the disk holder.
FIG. 5C is a right side view of the disk holder.
FIG. 5D is a bottom view of the disk holder.

Referring to FIG. 3 in addition to FIGS. 1 and 2, description will be made of the relationship among the carriage assembly 4, the feeding screw 2-1, and the guide bar 5.

The carriage assembly 4 comprises an upper carriage 41 and a lower carriage 42. The upper and the lower carriages 41 and 42 have one end portions provided with upper and lower magnetic heads 3a and 3b attached thereto, respectively. The upper carriage 41 can be opened upward in the figure. The flexible disk 80 is inserted between the upper and the lower carriages 41 and 42 while the upper carriage 41 is opened. After insertion, the upper carriage 41 is closed so that the magnetic heads 3a and 3b are positioned near a magnetic recording medium of the flexible disk 80.

The upper carriage 41 comprises a plate-like arm. On the other hand, the lower carriage 42 comprises a flat plate 42-1 supporting the lower magnetic head 3b and a protruding portion 42-2 formed on an opposite end opposite to the lower magnetic head 3b. The protruding portion 42-2 is coupled with a protruding portion 41-2 connected through a metal connecting plate 41-1 to the upper carriage 41. The protruding portion 41-2 is fixed together with the lower carriage 42. The upper carriage 41 has a spring fixing portion 41-3 protruding rightward in FIG. 3. From the spring fixing portion 41-3, a rod-like spring supporting portion 414 protrude forward in the figure. To the spring supporting portion 414, a spring 41-5 for urging the upper carriage 41 downward in the figure is attached.

The connecting plate 41-1 is fixed by a holding plate 41-6 attached to an upper surface of the protruding portion 41-2 by two screws. A positioning pin 41-7 serves to position the holding plate 41-6.

The upper carriage 41 is opened upward by a disk holder (which will later be described) before the flexible disk 80 is inserted. When the flexible disk 80 is inserted, the disk holder is moved downward. As a result, the upper carriage 41 is closed downward by the spring 41-5 and the upper magnetic head 3a is positioned near the magnetic recording medium of the flexible disk 80. When the flexible disk 80 is ejected, the upper carriage 41 is kept in an upward opened state by the disk holder which is moved upward.

A space is formed between the protruding portion 41-2 of the upper carriage 41 and the protruding portion 42-2 of the lower carriage 42. The feeding screw 2-1 is inserted through the space. In this space, a metal member (not shown) is arranged and engaged with a root portion of the feeding screw 2-1. Thus, the carriage assembly 4 is moved by rotation of the feeding screw 2-1 in its axial direction. The carriage assembly 4 has a movable range which will be called here a particular area.

The lower carriage 42 is provided with a thickened portion 42-3 formed at its intermediate portion and extending in parallel to the feeding screw 2-1. The thickened portion 42-3 has a through hole in which the guide bar 5 is slidably inserted. With this structure, the guide bar 5 guides the movement of the carriage assembly 4. In order to prevent a protruding part of the thickened portion 42-3 from being brought into contact with the main frame 1 to inhibit the movement of the carriage assembly 4, the main frame 1 is provided with a punched hole 1-5 (FIG. 1) in an area corresponding to a moving range of the thickened portion 42-3. This structure prevents an increase in size of the flexible disk drive in a vertical direction (thickness direction) due to presence of the protruding part of the thickened portion 42-3.

As illustrated in FIG. 1, the center of a disk table assembly 11 is shifted rightward in the figure from a center line of the flexible disk drive in left and right directions. Thus, as illustrated in FIG. 2, the feeding screw 2-1 is arranged by the use of a very small space between a left side edge of the main frame 1 and a left side edge of the flexible disk 80.

Next referring to FIGS. 4A to 4C, 5A to 5D, and 6A to 6C, description will be made of an eject plate (slide cam) 20, a disk holder 30, and an eject base (subframe) 50 used in the thin-profile flexible disk drive.

At first referring to FIGS. 4A to 4C, the eject plate 20 is for ejecting the flexible disk from the receiving portion and is arranged above the main frame 1 and inside the eject base 50 which will later be described. The eject plate 20 has a pair of side plates 21 formed on opposite sides thereof and extending downward, respectively. Each of the side plates 21 is provided with two guide grooves 21-3 for guiding the disk holder 30 which will later be described and two pins 21-4 to be inserted into guide holes of the eject base 50 which will later be described. Each guide groove 21-3 includes a first portion 21-3a extending in the second direction and a second portion 21-3b diagonally extending in a direction intersecting the second and the third directions.

Next referring to FIGS. 5A to 5D, the disk holder 30 is for holding the flexible disk and is arranged above the main frame 1 and inside the eject plate 20. The disk holder 30 is movable in the third direction and has a pair of side plates 31 formed on opposite sides thereof and extending downward, respectively. Each of the side plates 31 has an end (not shown) perpendicularly bent inward. Each of the side plates 31 is provided with two pins 31-3 corresponding to the two guide grooves 21-3 and a pin 31-4 to be inserted into a pin restricting groove of the eject base 50 which will later be described.

Next referring to FIGS. 6A to 6C, the eject base 50 is fixed to upper ends of opposite side plates of the main frame 1 in the following manner. The side plates of the main frame 1 are provided with screwing portions formed at the upper ends thereof by bending or the like. The eject base 50 is screwed to the screwing portions.

The eject base 50 includes a main portion 50a and a pair of side plates 51 formed on opposite sides of the main portion 50a and extending downward, respectively. Each of the side plates 51 is provided with a pin restricting groove 51-1 straightly extending downward and two guide holes 51-2 for guiding the two pins 21-4 of the eject plate 20. The pin restricting groove 51-1 is inserted with the pin 31-4 of the disk holder 30. For allowing the pin 31-4 to be freely moved, each of the side plates 21 of the eject plate 20 has a blank portion 21-5.

The guide holes 51-2 extend in the second direction, namely, inserting/removing directions of the flexible disk. One of the side plates 51 is provided with two recessed portions 51-3 which allow vertical movement of the two pins 31-3 formed on one of the side plates 31 of the disk holder 30, respectively. The other side plate 51 is provided with two openings 51-4 which allow vertical movement of the two pins 31-3 formed on the other side plate 31 of the disk holder 30.

Referring to FIGS. 7A to 7D, 8, and 9, description will be made of an assembly of the eject base 50, the eject plate 20, and the disk holder 30.

As seen from the figures, the pins 214 of the eject plate 20 are inserted into the guide holes 51-2 of the eject base 50 and guided along the guide holes 51-2, respectively. The pins 31-4 of the disk holder 30 are inserted into the pin restricting grooves 51-1 of the eject base 50 so that the disk holder 30 is slidable only in the vertical direction following sliding movement of the eject plate 20.

Thus, a combination of the guide holes 51-2 formed on the opposite side plates 51 of the eject base 50 and the pins 21-4 formed on the opposite side plates 21 of the eject plate 20 forms a sliding mechanism or a guiding mechanism for sliding or guiding the eject plate 20 with respect to the eject base 50. In addition, the guide grooves 21-3 and the pins 31-3 cooperates with each other to serves as a following mechanism which is for moving the disk holder 30 in the third direction in response to movement of the eject plate 20 in the second direction.

Figure 9:
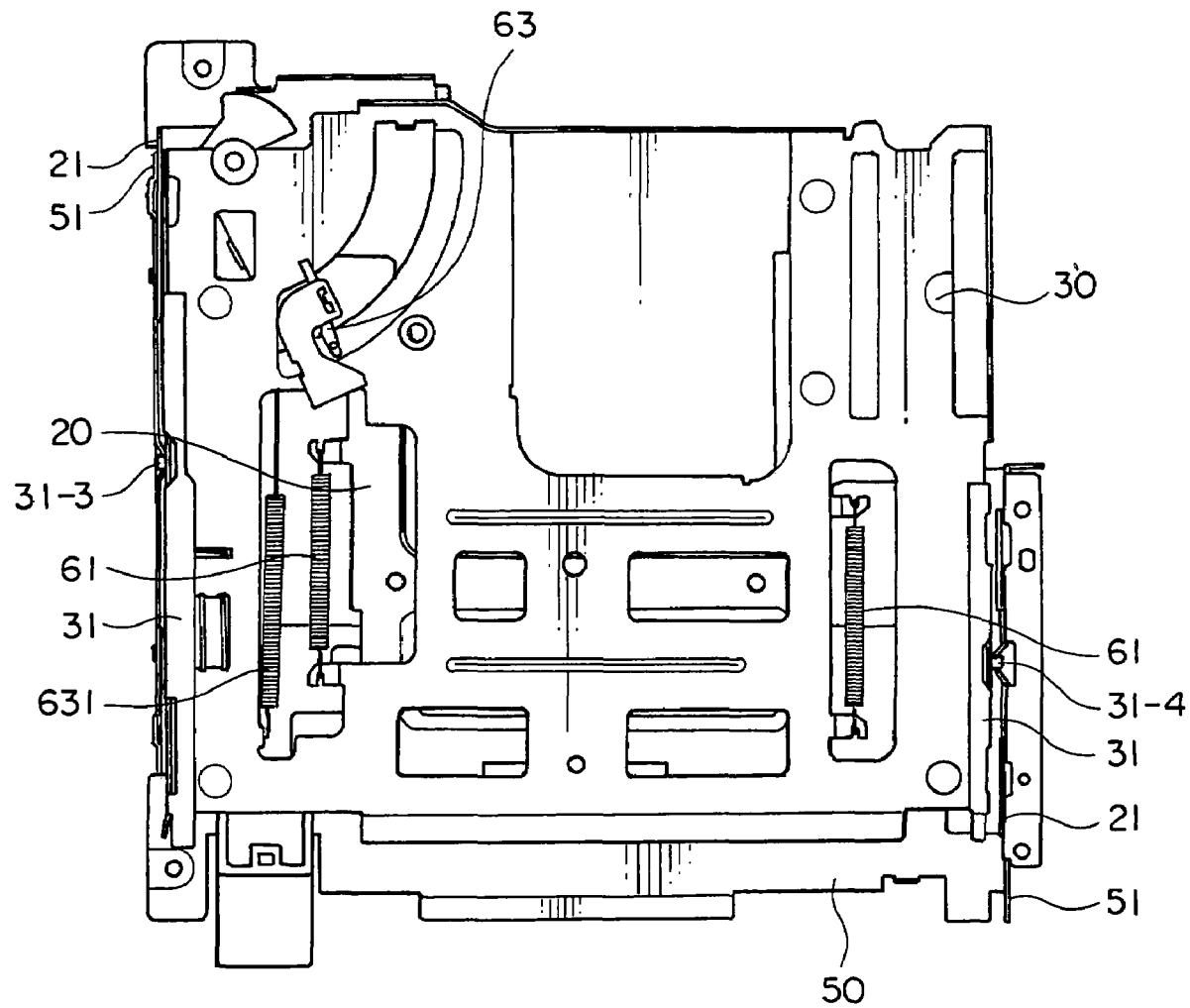
FIG. 9 is a bottom view of the assembly.

As is obvious from FIG. 9, two eject springs 61 are bridged between the disk holder 30 and the eject plate 20 for urging the eject plate 20 towards a direction of ejecting the flexible disk. A disk shutter arm 63 is rotatably attached to the disk holder 30. The disk shutter arm 63 is urged by a shutter arm spring 631 in a counterclockwise direction. The shutter arm spring 631 is bridged between the disk shutter arm 63 and the disk holder 30. The disk shutter arm 63 illustrated in the figure is operable not only as an eject lever but also as a head protection structure.

Figure 10:
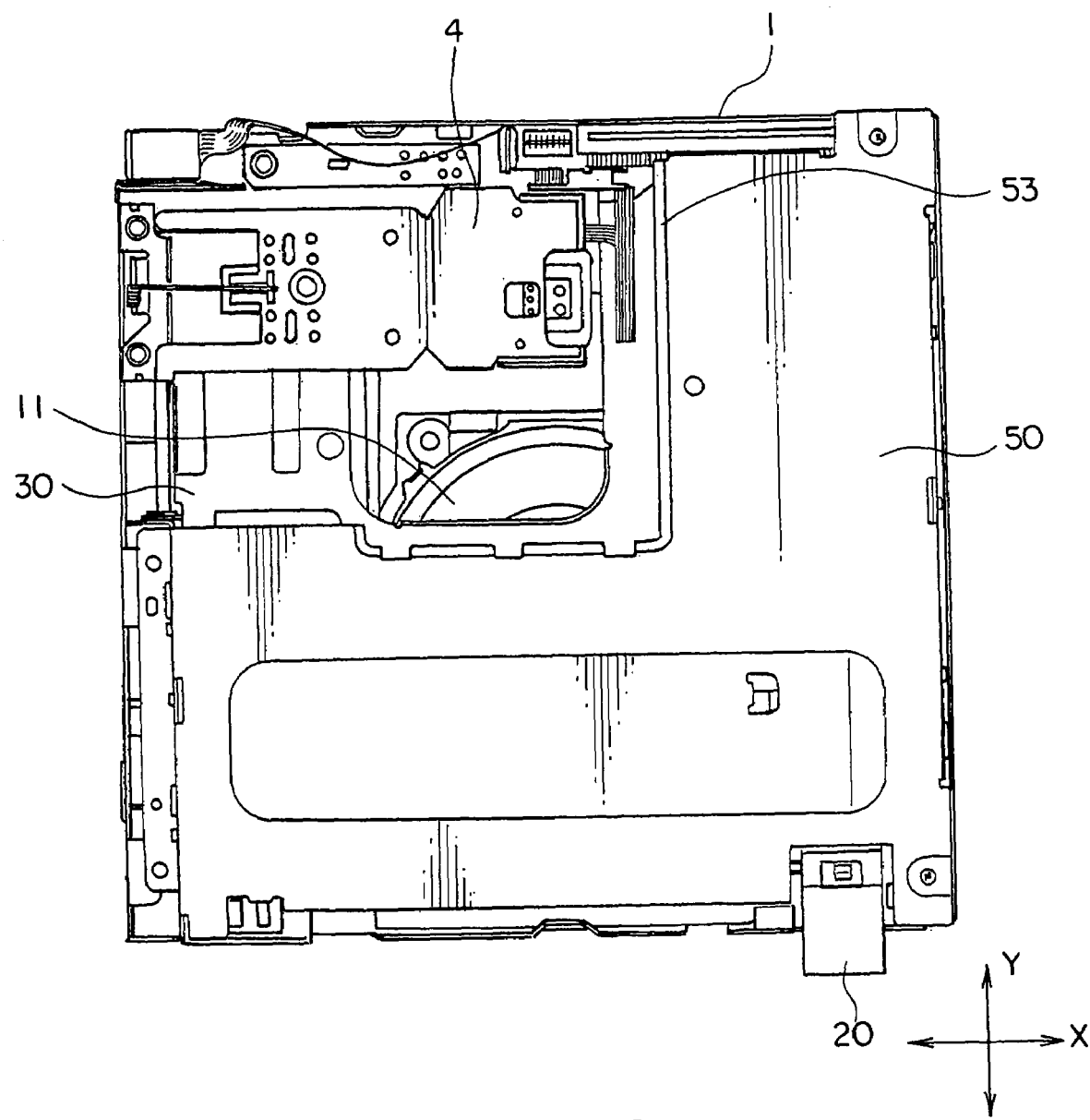
FIG. 10 is a plan view of the thin-profile flexible disk drive in FIG. 1 after removing a cover.

In the thin-profile flexible disk drive described above, the sliding mechanism is formed by utilizing the opposite side plates 21 and 51 of the eject plate 20 and the eject base 50. Furthermore, the eject springs 61 are bridged between the disk holder 30 and the eject plate 50. As illustrated in FIG. 10, the eject base 50 is also used as a main cover covering the eject plate 20 except a particular area or a moving range of the carriage assembly 4.

Figure 11:
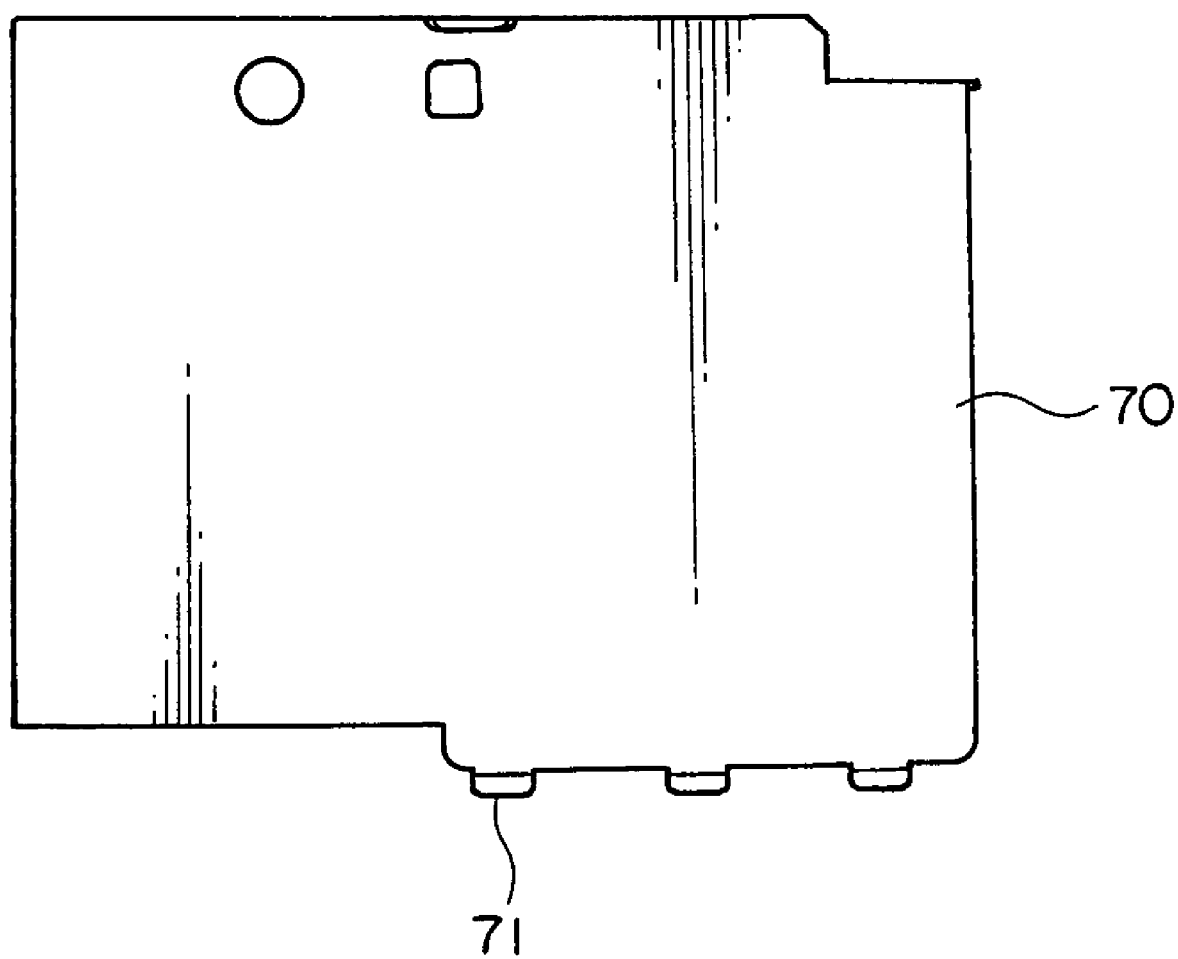
FIG. 11 is a plan view of the cover used in the thin-profile flexible disk drive in FIG. 10.

The thin-profile flexible disk drive may further comprise an additional cover 70 illustrated in FIG. 11. The cover 70 is attached to the eject base 50 to cover the moving range of the carriage assembly 4. Since the cover 70 covers only the moving range of the carriage assembly 4, the size of the cover 70 can be reduced to ¼ as compared with an existing cover. As a result, a material cost can be reduced.

Figure 12:
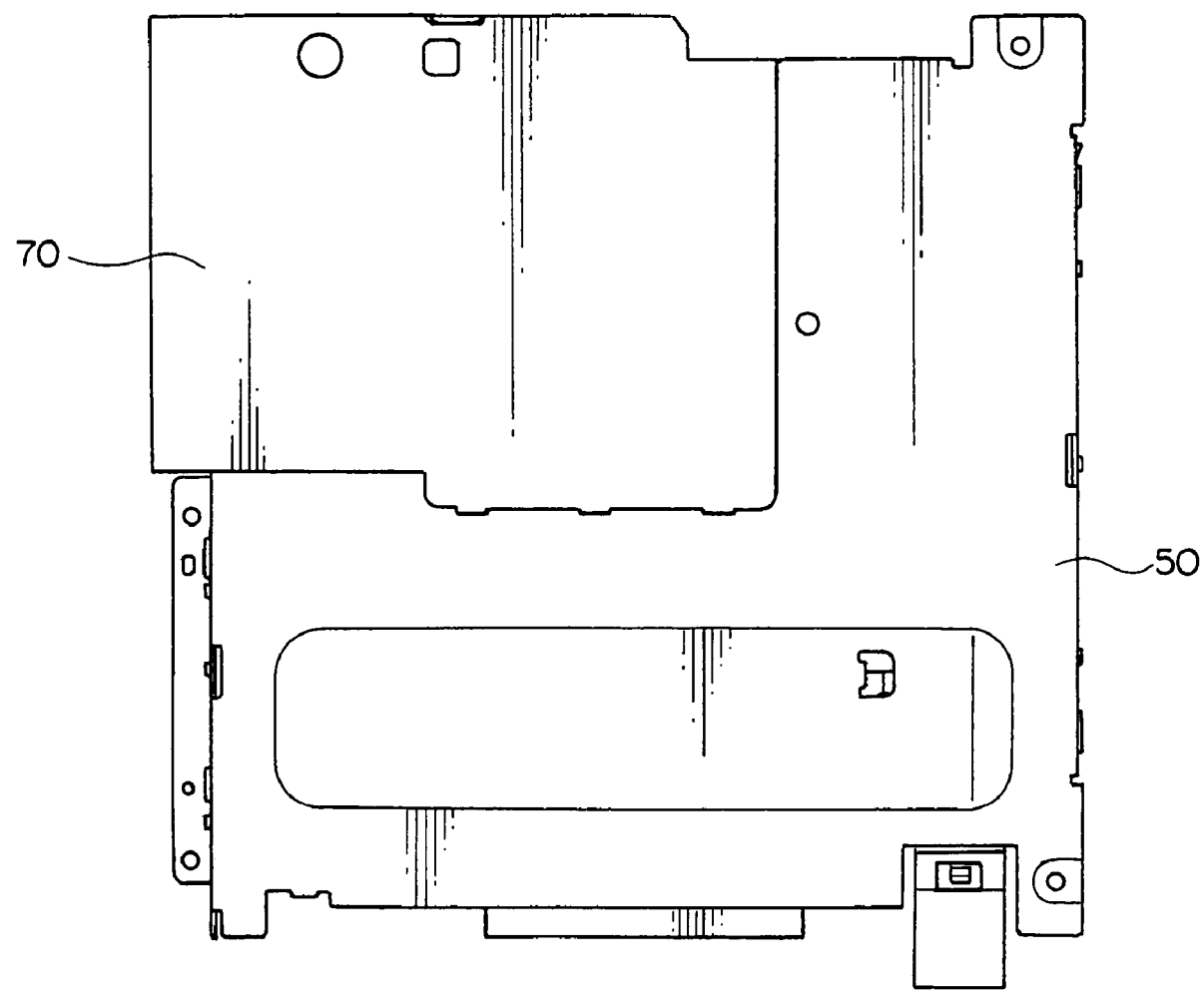
FIG. 12 is a plan view of the assembly illustrated in FIGS. 7A to 7D with the cover in FIG. 11 attached thereto.

Referring to FIG. 12, the cover 70 is fixed to the eject base (assembly) 50.

Figure 8:
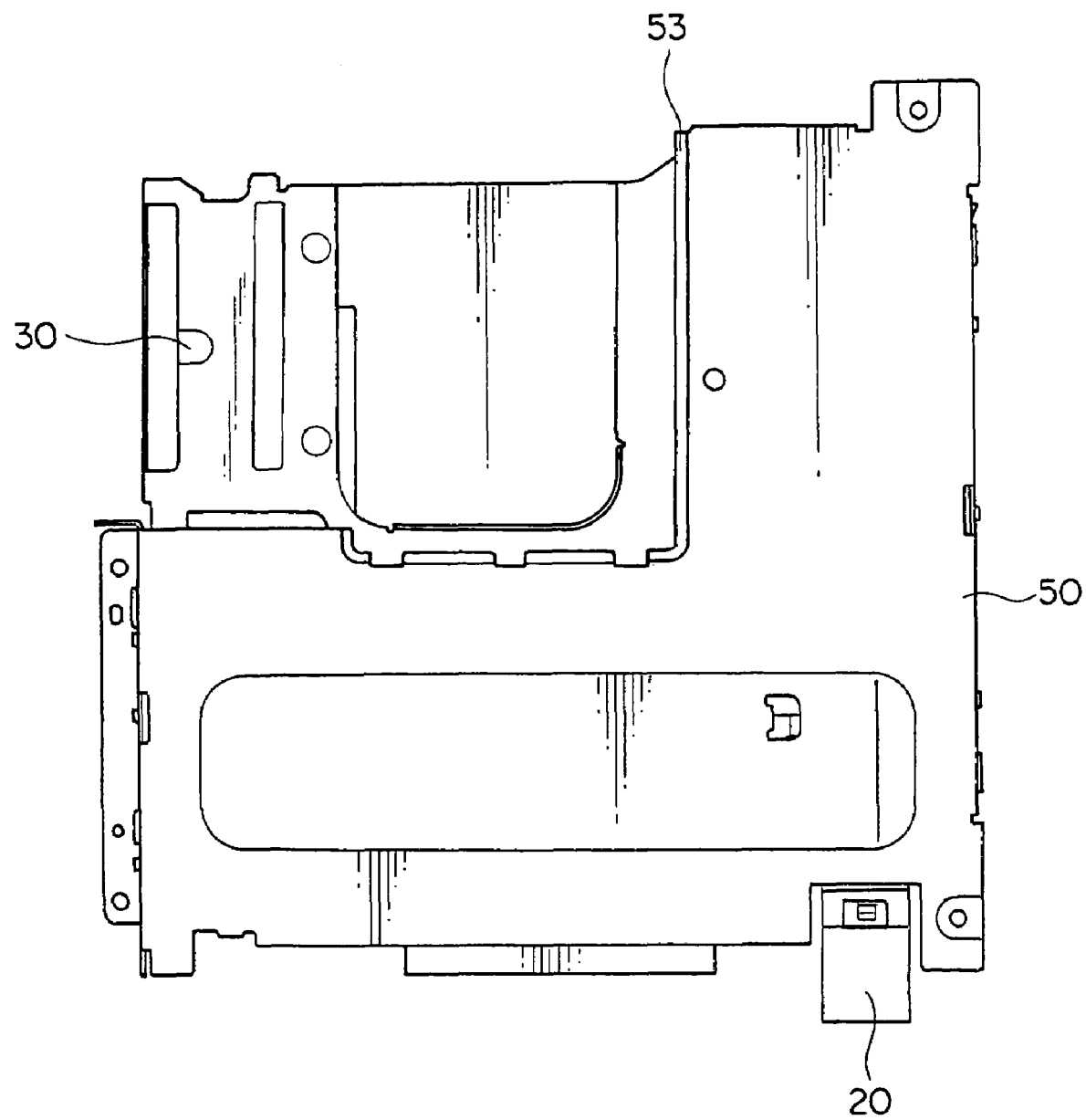
FIG. 8 is a plan view of the assembly illustrated in FIGS. 7A to 7D.

As illustrated in FIG. 8, the eject base 50 has a receiving portion 53 for receiving the cover 70. On the other hand, as illustrated in FIG. 11, the cover 70 has three engaging protrusions 71 to be engaged with a lower surface of the eject base 50. In the example being illustrated, the cover 70 has the three engaging protrusions 71. However, it is sufficient that the cover 70 has at least one engaging protrusion.

With the above-mentioned structure, the cover 70 can easily be fixed to the eject base 50 to be coplanar or flush with a principal surface of the upper cover after fixing.

It will readily be understood that this invention is not restricted to the above-described embodiment but may be modified in various other manners within the scope not deviated from the gist of this invention. For example, in the above-mentioned embodiment, a combination of the guide holes formed on the opposite side plates of the eject base and the pins formed on the opposite side plates of the eject plates is provided as the sliding mechanism. However, the sliding mechanism is not limited thereto but may be formed by a combination of guide holes formed on the opposite side plates of the eject plate and pins formed on the opposite side plates of the eject base. Thus, the sliding mechanism may be formed in any appropriate manner as far as it is formed the opposite side plates of the eject plate and the eject base. In the above-mentioned embodiment, description is directed applied to the thin-profile flexible disk drive in which the feeding screw of the stepping motor extends along one of the left and the right side edges of the main frame and the carriage assembly extends in the direction perpendicular to the feeding screw so as to reduce the size in the depth direction. However, it will readily be understood that this invention is also applicable to a thin-profile flexible disk drive in which the carriage assembly extends in parallel to the feeding screw of the stepping motor.

What is claimed is:

1. A flexible disk drive for a flexible disk, comprising:
   a main frame defining a receiving portion for receiving the flexible disk, the main frame having a principal surface which faces the receiving portion and extends in a first direction and a second direction perpendicular to the first direction;
   a carriage assembly mounted on the main frame and having a magnetic head for accessing the flexible disk, the carriage assembly being movable to carry the magnetic head along the principal surface;
   an eject base coupled to the main frame and having a main portion facing the principal surface and side plates opposite to each other in the first direction;
   an eject plate placed between the main frame and the eject base and movable in the second direction for ejecting the flexible disk from the receiving portion, the eject plate having side plates facing the side plates of the eject base in the first direction, respectively; and
   a guiding mechanism coupled to the side plates of the eject base and to the side plates of the eject plate for guiding movement of the eject plate in the second direction.

2. The flexible disk drive according to claim 1, further comprising:
   a disk holder placed between the main frame and the eject plate for holding the flexible disk and movable in a third direction perpendicular to the first and the second directions; and
   a following mechanism coupled to the eject plate and the disk holder for moving the disk holder in the third direction in response to movement of the eject plate in the second direction.

3. The flexible disk drive according to claim 2, further comprising an eject spring connected between the disk holder and the eject plate for urging the eject plate towards a direction of ejecting the flexible disk from the receiving portion.

4. The flexible disk drive according to claim 2, wherein the disk holder has side plates which are facing the side plates of the eject plate, respectively, each of the side plates of the eject plate having guide grooves, each of the side plates of the disk holder having pins inserted in the guide grooves, respectively, the guide grooves and the pins cooperating with each other to serve as the following mechanism.

5. The flexible disk drive according to claim 4, wherein each of the guide grooves has a first portion extending in the second direction and a second portion extending in a direction intersecting the second and the third directions.

6. The flexible disk drive according to claim 4, wherein each of the side plates of the eject base further has a guide groove extending in the third direction, each of the side plates of the disk holder having an additional pin inserted in the guide groove of the eject base, each of the side plates of the eject plate having a blank portion allowing the additional pin to be freely moved.

7. The flexible disk drive according to claim 1, further comprising a cover fixed to the eject base and covering a particular area in which the carriage assembly is movable.

8. The flexible disk drive according to claim 7, wherein the eject base has a receiving portion receiving the cover.

9. The flexible disk drive according to claim 8, wherein the cover has at least one engaging protrusion to be engaged with the eject base in a third direction perpendicular to the first and the second directions.

10. The flexible disk drive according to claim 1, wherein each of the side plates of the eject base has a guide hole extending in the second direction, each of the side plates of the eject plate having a pin inserted in the guide hole, the guide hole and the pin cooperating with each other to serve as the guiding mechanism.

11. The flexible disk drive according to claim 10, wherein each of the side plates of the eject base further has a groove which extends from the guide hole in the third direction to have an opened end.

12. The flexible disk drive according to claim 1, wherein the main portion of the eject base serves as a main cover extending in the first and the second directions except a particular area in which the carriage assembly is movable.

13. The flexible disk drive according to claim 12, further comprising an additional cover placed to cover the particular area and coupled to the eject base.

* * * * *